(12) United States Patent
Friedel

(10) Patent No.: US 10,189,975 B2
(45) Date of Patent: Jan. 29, 2019

(54) CABLE FILL COMPOSITION

(71) Applicant: SHELL OIL COMPANY, Houston, TX (US)

(72) Inventor: Joerg Friedel, Hamburg (DE)

(73) Assignee: SHELL OIL COMPANY, Houston, TX (US)

( * ) Notice: Subject to any disclaimer, the term of this patent is extended or adjusted under 35 U.S.C. 154(b) by 244 days.

(21) Appl. No.: 14/418,117

(22) PCT Filed: Jul. 30, 2013

(86) PCT No.: PCT/EP2013/065955
§ 371 (c)(1),
(2) Date: Jan. 29, 2015

(87) PCT Pub. No.: WO2014/020007
PCT Pub. Date: Feb. 6, 2014

(65) Prior Publication Data
US 2015/0166766 A1    Jun. 18, 2015

(30) Foreign Application Priority Data

Aug. 1, 2012 (EP) .................................... 12178774

(51) Int. Cl.
*G02B 6/44* (2006.01)
*C08K 5/01* (2006.01)
(Continued)

(52) U.S. Cl.
CPC .......... *C08K 5/01* (2013.01); *B29D 11/00701* (2013.01); *C10M 169/02* (2013.01); *G02B 6/4494* (2013.01); *B29K 2009/06* (2013.01); *B29K 2105/0085* (2013.01); *C10M 2205/022* (2013.01); *C10M 2205/0213* (2013.01); *C10M 2205/04* (2013.01); *C10M 2205/046* (2013.01); *C10M 2205/173* (2013.01); *C10N 2220/021* (2013.01); *C10N 2220/022* (2013.01); *C10N 2230/02* (2013.01); *C10N 2230/10* (2013.01);
(Continued)

(58) Field of Classification Search
CPC .. G02B 6/4459; G02B 6/50; B29D 11/00701; C08K 5/01
USPC .................................................. 385/100–109
See application file for complete search history.

(56) References Cited

U.S. PATENT DOCUMENTS 3,893,962 A * 7/1975 Walton .................... C08L 23/20
523/173
4,509,821 A   4/1985 Stenger
(Continued)

FOREIGN PATENT DOCUMENTS

CN       101203587 A    6/2008
DE       102004028140   1/2006
(Continued)

*Primary Examiner* — Thomas A Hollweg
*Assistant Examiner* — Hung Lam

(57) ABSTRACT

A cable fill composition for an optical fiber cable, said cable fill composition comprising (i) a Fischer-Tropsch derived base oil; and (ii) a thickening system, wherein the thickening system comprises at least one block copolymer. The cable fill composition of the present invention provides improvements in rheological characteristics, low temperature properties, and colour stability properties, as well as minimizing the levels of additives such as antioxidants and pour point depressants which need to be used.

19 Claims, 1 Drawing Sheet

(51) Int. Cl.
*C10M 169/02* (2006.01)
*B29D 11/00* (2006.01)
*B29K 9/06* (2006.01)
*B29K 105/00* (2006.01)

(52) U.S. Cl.
CPC ...... *C10N 2230/20* (2013.01); *C10N 2230/26* (2013.01); *C10N 2240/50* (2013.01); *C10N 2250/10* (2013.01)

(56) References Cited

U.S. PATENT DOCUMENTS

| | | | |
|---|---|---|---|
| 4,701,016 | A | 10/1987 | Gartside et al. |
| 4,810,395 | A * | 3/1989 | Levy et al. .................. 508/136 |
| 4,870,117 | A | 9/1989 | Levy |
| 5,505,773 | A * | 4/1996 | Vitands et al. .............. 516/100 |
| 5,905,833 | A | 5/1999 | Sheu |
| 5,906,727 | A * | 5/1999 | Wittenbrink ........... C10G 45/58 208/14 |
| 8,211,968 | B2 * | 7/2012 | Yang .................. C08L 23/0815 524/490 |
| 2005/0137290 | A1 | 6/2005 | Hagen et al. |
| 2006/0113512 | A1 | 6/2006 | Rosenbaum et al. |
| 2007/0021560 | A1 * | 1/2007 | Tse ........................ C08L 23/02 525/88 |
| 2008/0045614 | A1 | 2/2008 | Benard et al. |
| 2008/0045638 | A1 * | 2/2008 | Chapman et al. ............ 524/425 |

FOREIGN PATENT DOCUMENTS

| | | |
|---|---|---|
| EP | 0058022 A1 | 8/1982 |
| EP | 0668342 | 8/1995 |
| EP | 0776959 | 6/1997 |
| EP | 0811864 | 12/1997 |
| EP | 1029029 | 8/2000 |
| JP | S4842005 A | 6/1973 |
| JP | 2007510034 A | 4/2007 |
| JP | 2007522282 A | 8/2007 |
| WO | 9721788 | 6/1997 |
| WO | 9941332 | 8/1999 |
| WO | 0008115 | 2/2000 |
| WO | 0014179 | 3/2000 |
| WO | 0014183 | 3/2000 |
| WO | 0014187 | 3/2000 |
| WO | 0014188 | 3/2000 |
| WO | 0015736 | 3/2000 |
| WO | 0118156 | 3/2001 |
| WO | 0157166 | 8/2001 |
| WO | 2012017023 | 2/2012 |

* cited by examiner

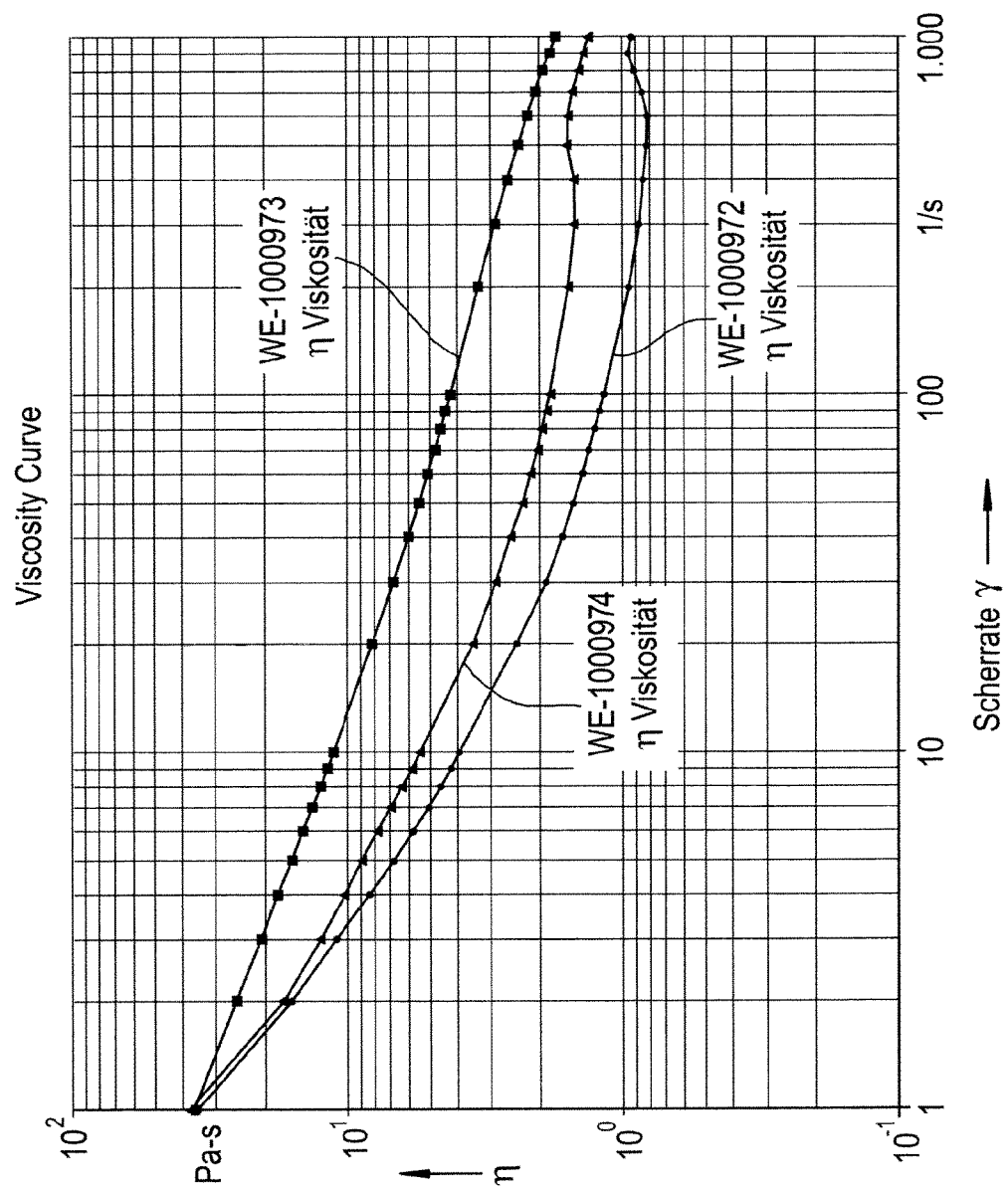

CABLE FILL COMPOSITION

PRIORITY CLAIM

The present application is the National Stage (§ 371) of International Application No. PCT/EP2013/065955, filed Jul. 30, 2013, which claims priority from European Patent Application No. 12178774.1, filed Aug. 1, 2012.

FIELD OF THE INVENTION

The present invention relates to a cable fill composition, in particular a cable fill composition for use in communication cables, such as electrical and optical cables, in particular for use in optical fiber cables.

BACKGROUND OF THE INVENTION

An optical fiber cable is a cable containing one or more optical fibers. The optical fiber elements are typically individually coated with plastic layers and contained in a protective tube suitable for the environment where the cable will be deployed. Usually gel compositions are used to fill the gap between the protective tube and the optical fiber. The gel composition gives some mechanical protection and is used to insulate the fiber from water in case of damage to the tubing.

A widely practised solution devised by those skilled in the art to minimize water penetration into the cable in the case of damage to the plastic tubing involves filling the interior interstitial space of a cable with a water insoluble filling material, such as a sealant, that plugs the cable and stops the migration of water into the cable. When a filling material is used, several factors are usually taken into consideration, such as, for example, its dielectric constant, density, aging, temperature stability, hydrophobic nature of the composition, processing and handling characteristics, shrinkage of the filling material upon cooling, toxicity, cost, and the like.

While the foregoing technology may be useful, there exists a need for a cable fill composition that can be used in electrical or optical cables, which provides, in particular, improvements in processability such as ease of manufacture and ease of use, improved rheology characteristics, improved thixotropy, improved low temperature properties, improved colour stability, reduced loss of composition in the case of cable damage, while taking into consideration the factors listed in the preceding paragraph.

SUMMARY OF THE INVENTION

According to a first aspect of the present invention there is provided a cable fill composition for an optical fiber cable, said cable fill composition comprising (i) a Fischer-Tropsch derived base oil; and (ii) a thickening system, wherein the thickening system comprises at least one block copolymer.

According to a second aspect of the present invention there is provided an optical fiber cable comprising a cable fill composition, wherein the cable fill composition comprises (i) a Fischer-Tropsch derived base oil; and (ii) a thickening system.

According to a third aspect of the present invention there is provided the use of a composition comprising a Fischer-Tropsch derived base oil and a thickening system in a cable fill composition for an optical fiber cable.

It has surprisingly been found that the use of a Fischer-Tropsch derived base oil in a cable fill composition together with a thickening system provides improvements in processability and rheology characteristics, together with improvements in low temperature properties and colour stability properties, as well as minimizing the levels of additives such as pour point depressants and antioxidants which need to be used.

In particular, it has been found that the cable fill composition of the present invention exhibits a lower viscosity at high shear rates which improves ease of manufacture and ease of application of the composition.

It has also been found that the cable fill composition has a low effect on the viscosity of the composition at low shear rates which means low or no loss of composition in case of cable damage.

It has also been found that the cable fill composition of the present invention advantageously has a higher flashpoint compared with cable fill compositions which use conventional paraffinic oils.

It has further been found that the cable fill composition of the present invention exhibits low or no discolouration at elevated temperatures, hence minimizing the levels of antioxidants which need to be used.

It has further been found that the cable fill composition of the present invention exhibits high cone penetration at low temperatures in comparison to cable fill compositions made with paraffinic oils, which means that the composition can be used in colder climates.

DETAILED DESCRIPTION OF THE INVENTION

The cable fill composition of the present invention comprises a Fischer-Tropsch derived base oil.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the cable fill composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156 and WO 01/57166.

Typically, the aromatics content of a Fischer-Tropsch derived base oil, suitably determined by ASTM D 2007, will typically be below 1 wt. %, preferably below 0.5 wt. % and more preferably below 0.1 wt. %. Suitably, the base oil has a total paraffin content of at least 80 wt. %, preferably at least 85, more preferably at least 90, yet more preferably at least 95 and most preferably at least 99 wt. %. It suitably has a saturates content (as measured by IP-368) of greater than 98 wt. %. Preferably the saturates content of the base oil is greater than 99 wt. %, more preferably greater than 99.5 wt. %. It further preferably has a maximum n-paraffin content of 0.5 wt. %. The Fischer-Tropsch derived base oil preferably also has a content of naphthenic compounds of from 0 to less than 20 wt. %, more preferably of from 0.5 to 10 wt. %.

Typically, the Fischer-Tropsch derived base oil or base oil blend has a kinematic viscosity at 100° C. (as measured by ASTM D 7042) in the range of from 1 to 35 mm$^2$/s (cSt), preferably from 1 to 25 mm$^2$/s (cSt), more preferably from 2 mm$^2$/s to 12 mm$^2$/s. Preferably, the Fischer-Tropsch derived base oil has a kinematic viscosity at 100° C. (as measured by ASTM D 7042) of at least 2.5 mm$^2$/s, more preferably at least 3.0 mm$^2$/s. In one embodiment of the present invention, the Fischer-Tropsch derived base oil has a kinematic viscosity at 100° C. of at most 5.0 mm$^2$/s, preferably at most 4.5 mm$^2$/s, more preferably at most 4.2 mm$^2$/s (e.g. "GTL 4"). In another embodiment of the present invention, the Fischer-Tropsch derived base oil has a kinematic viscosity at 100° C. of at most 8.5 mm$^2$/s, preferably at most 8 mm$^2$/s (e.g. "GTL 8").

Further, the Fischer-Tropsch derived base oil typically has a kinematic viscosity at 40° C. (as measured by ASTM D 7042) of from 10 to 100 mm$^2$/s (cSt), preferably from 15 to 50 mm$^2$/s.

Also, the Fischer-Tropsch derived base oil preferably has a pour point (as measured according to ASTM D 5950) of below −30° C.

The flash point (as measured by ASTM D92) of the Fischer-Tropsch derived base oil is preferably greater than 190° C., more preferably even greater than 220° C.

The Fischer-Tropsch derived base oil preferably has a viscosity index (according to ASTM D 2270) in the range of from 100 to 200. Preferably, the Fischer-Tropsch derived base oil has a viscosity index of at least 125, preferably 130. Also it is preferred that the viscosity index is below 180, preferably below 150.

Commercially available Fischer-Tropsch derived base oils suitable for use in the cable fill composition herein include those available from Royal Dutch Shell under the Risella X tradename, including Risella X 415, Risella X 420 and Risella X 430.

It is also possible to use hydrotreated Fischer-Tropsch derived base oils of medicinal quality, as the Fischer-Tropsch derived base oil for use herein.

In the event the Fischer-Tropsch derived base oil contains a blend of two or more Fischer-Tropsch derived base oils, the above values apply to the blend of the two or more Fischer-Tropsch derived base oils.

Preferably, the cable fill composition contains more than 80 wt. %, more preferably more than 90 wt. %, even more preferably more than 92 wt. %, of Fischer-Tropsch derived base oil, by weight of the cable fill composition.

In addition to the Fischer-Tropsch derived base oil, the cable fill composition may comprise one or more other types of mineral derived or synthetic base oils, including Group I, II, III, IV and V base oils according to the definitions of American Petroleum Institute (API). These API categories are defined in API Publication 1509, 15th Edition, Appendix E, July 2009.

Another type of base oil suitable for use in the cable fill composition herein is an alkyl aromatic base oil, such as an alkylated naphthalene, or a linear alkyl benzene.

Another type of base oil suitable for use in the cable fill composition herein is a fatty acid derivate, e.g. vegetable oil esters.

The total amount of base oil incorporated in the cable fill composition of the present invention is preferably an amount in the range of from 50 to 97 wt. %, more preferably an amount in the range of from 85 to 95 wt. %, with respect to the total weight of the cable fill composition.

The cable fill composition additionally comprises a thickening system. Preferably the thickening system comprises at least one block copolymer.

The block copolymer is preferably present at a level of 15 wt % or less, more preferably in the range of from 3 wt % to 10 wt %, even more preferably in the range of from 5 wt % to 9 wt %, by weight of the cable fill composition.

A preferred block copolymer for use herein is a styrenic block copolymer consisting of polystyrene blocks and rubber blocks.

Preferably the block polymer is selected from diblock copolymers, triblock copolymers, and mixtures thereof.

Suitable diblock copolymers include, but are not limited to, styrene-ethylene/butylene and styrene-ethylene/propylene.

Suitable triblock copolymers include, but are not limited to, styrene-butadiene-styrene (SBS), styrene-isoprene-styrene (SIS), styrene-ethylene/butylene-styrene (SEBS), styrene-ethylene/propylene-styrene (SEPS), and mixtures thereof. Commercially available triblock polymers are Kraton D (SBS and SIS), commercially available from Kraton Polymers, Houston, Tex., USA. Commercially available diblock polymers are Kraton G (SEB and SEP), commercially available from Kraton Polymers, Houston, Tex., USA.

A preferred block copolymer for use herein is KRATON G-1701 Block Copolymer commercially available from Kraton Polymers, Houston, Tex., USA, which is a clear, linear diblock copolymer based on styrene and ethylene/propylene with a polystyrene content of 37%.

Other types of block polymers suitable for use herein are block poly-olefins (also known as Ziegler-Natta polyolefins, amorphous polyolefins (APO) or metallocene polyolefins (MPO)).

The block polymers can be used herein in combination with other thickener types such as other types of polymers, clays or waxes.

The cable fill composition can optionally contain one or more additives, such as antioxidants, pour point depressants, copper passivators, and the like. The person skilled in the art will be aware of such additives and the typical amounts of each such additive to include in the compositions of the present invention.

The cable fill composition can optionally contain antioxidants or stabilizers preferably at a level of less than 1% by weight to improve processing or to protect against environmental aging caused by heat. Suitable antioxidants or stabilizers include phenols, phosphites, phosphorites, thiosynergists, amines, benzoates, and mixtures thereof.

In one embodiment of the present invention, the cable fill composition comprises one or more antioxidants. Suitable antioxidants for use herein include phenolic antioxidants and/or aminic antioxidants. The cable fill composition of the present invention may comprise mixtures of one or more phenolic antioxidants with one or more aminic antioxidants.

When present in the cable fill composition of the present invention, said antioxidants are preferably at a level in the range of from 0.1 to 5.0 wt. %, more preferably in the range of from 0.3 to 3.0 wt. %, and most preferably in the range of from 0.5 to 1.5 wt. %, based on the total weight of the cable fill composition.

In one preferred embodiment of the present invention, the cable fill composition is free of antioxidants.

The cable fill composition of the present invention preferably has a dynamic viscosity at 25° C. (at a shear rate of 1 s$^{-1}$) (using ISO 2555) in the range of from 20 to 200 Pa·s, more preferably in the range of from 25 to 50 Pa·s, even more preferably in the range of from 30 to 40 Pa·s.

The cable fill composition of the present invention is preferably in the form of a gel, preferably a thixotropic gel.

The cable fill composition of the present invention may be conveniently prepared by admixing the Fischer-Tropsch derived base oil, and any other base oil(s) with the thickening system and any additive(s) at elevated temperatures.

The cable fill composition according to the present invention may be used in various applications, such as in electrical cables, optical fiber cables, and the like. The cable fill composition of the present invention is particularly suitable for use in an optical fiber cable. Hence according to another aspect of the present invention there is provided an optical fiber cable, said optical fiber cable comprising a cable fill composition, wherein the cable fill composition comprises (i) a Fischer-Tropsch derived base oil; and (ii) a thickening system.

It has been surprisingly found that by using a Fischer-Tropsch derived base oil in the cable fill composition instead of a conventional Group II base oil or Group III base oil, improvements can be seen in terms of rheology characteristics, processability, ease of use, thixotrophy, color stability and low temperature properties. Therefore, according to another aspect of the present invention there is provided the use of a composition comprising a Fischer-Tropsch derived base oil and a thickening system in a cable fill composition for an optical fiber cable.

The present invention is described below with reference to the following Examples, which are not intended to limit the scope of the present invention in any way.

EXAMPLES

Cable Fill Compositions

The cable fill compositions of the Examples and Comparative Examples were prepared using a conventional laboratory mixer by heating the base oil to a temperature of 130° C. and adding the block copolymer. The mixture was stirred for about 50 minutes followed by vacuum degassing.

"Base oil 1" (or "BO1" or "GTL 4") was a Fischer-Tropsch derived base oil having a kinematic viscosity at 100° C. (ISO 3104) of approximately 4.1 cSt (mm$^2$ s$^{-1}$) Base oil 1 is commercially available from Royal Dutch Shell under the tradename Risella X 420.

"Base oil 2" (or "BO2") was a commercially available Group II base oil having a kinematic viscosity at 40° C. (ISO 3104) of approximately 21.7 cSt. Base oil 2 is commercially available from Royal Dutch Shell under the trade designation "Catenex T121".

"Base oil 3" (or "BO3") was a commercially available Group III base oil having a kinematic viscosity at 100° C. (ASTM D445) of approximately 4.3 cSt. Base oil 3 is commercially available from Neste Oil under the tradename Nexbase 3043.

The block copolymer used in the Examples and Comparative Examples was KRATON G1701 commercially available from Kraton Polymers, Houston, Tex. KRATON G1701 is a clear, linear diblock copolymer based on styrene and ethylene/propylene with a polystyrene content of 37%.

Table 1 shows the physical properties of the base oils. Table 2 shows the amounts of base oil and polymer incorporated into the respective formulations. The amounts are given in wt %, based on the total weight of cable fill composition.

Example 1 is an example according to the present invention, while Examples 2 and 3 are comparative examples.

TABLE 1

| | | | Oil Trade Name: | | |
| | | | Risella X 430 | Catenex T 121 | Nexbase 3043 |
| | | | Oil Description: | | |
| | Units | Test Method | Fischer-Tropsch base oil ("GTL 4") | Group II base oil | Mineral Group III base oil |
|---|---|---|---|---|---|
| Density at 15° C. | Kg/m$^3$ | ISO 12185 | 816.8 | 854.4 | 835.7 |
| Refractive Index at 20° C. | | ASTM D 1218 | 1.4541 | 1.468 | 1.4615 |
| Kinematic Viscosity at 40° C. | mm$^2$/s | ISO 3104 | 18.02 | 20.31 | 19.9 |
| Kinematic Viscosity at 100° C. | mm$^2$/s | ISO 3104 | 4.09 | 4.1 | 4.27 |
| Pour Point | ° C. | ISO 2592 | −33 | −15 | −18 |
| Flash Point COC | ° C. | ISO 3016 | 228 | 209 | 224 |
| Colour Saybolt after 68 hours at 140° C. | | ASTM D156 | +30 | +15 | +24 |

TABLE 2

| | Example: | | |
| | 1 (wt %) (Sample No. WE1000972) | 2 (wt %) (Sample No. WE1000973) | 3 (wt %) (Sample No. WE1000974) |
|---|---|---|---|
| BO1 (GTL 4) | 92.251 | 0 | 0 |
| BO2 (Catenex T121) | 0 | 92.251 | 0 |
| BO3 (Nexbase 3043) | 0 | 0 | 92.251 |
| Kraton G1701 | 7.749 | 7.749 | 7.749 |
| Total: | 100 | 100 | 100 |

Test Method for Dynamic Viscosity Under Shear

The dynamic viscosity under shear of Examples 1-3 was measured using test method ISO 2555 using the following instrumental data/parameters:
Viscometer: Anton-Paar MCR301.
Parameters: Cone/Plate
  1° Cone, 25 mm diameter
  temperature 25° C.
  Logarithmic shear ramp from 1 to 5000 s$^{-1}$
  50 data points with 8 s time per point The results of the dynamic viscosity measurements of Examples 1-3 are set out in Table 3 and FIG. 1.

Test Method for Penetration

The penetration of Examples 1-3 was measured at a temperature of −40° C. using test method ISO 13737 without pre-treatment using a Sommer & Runge PHR 10 penetrometer. The penetration measurements are set out in Table 4 below.

TABLE 3

| | Example 1 (Sample No. WE1000972) | Example 2 (Sample No. WE-1000973) | Example 3 (Sample No. WE-1000974) |
| Shear Rate [1/s] | Dynamic Viscosity at 25° C. [Pa · s] | Dynamic Viscosity at 25° C. [Pa · s] | Dynamic Viscosity at 25° C. [Pa · s] |
|---|---|---|---|
| 1 | 35.3 | 36.1 | 37.8 |
| 2 | 15.9 | 25.2 | 17.1 |
| 3 | 11.0 | 20.5 | 12.7 |
| 4 | 8.32 | 17.8 | 10.3 |
| 5 | 6.76 | 15.9 | 8.88 |
| 6 | 5.75 | 14.5 | 7.82 |
| 7 | 5.07 | 13.4 | 7.02 |
| 8 | 4.60 | 12.6 | 6.39 |

TABLE 3-continued

| Shear Rate [1/s] | Example 1 (Sample No. WE1000972) Dynamic Viscosity at 25° C. [Pa · s] | Example 2 (Sample No. WE-1000973) Dynamic Viscosity at 25° C. [Pa · s] | Example 3 (Sample No. WE-1000974) Dynamic Viscosity at 25° C. [Pa · s] |
|---|---|---|---|
| 9 | 4.22 | 11.9 | 5.89 |
| 10 | 3.92 | 11.3 | 5.47 |
| 20 | 2.40 | 8.13 | 3.52 |
| 30 | 1.87 | 6.79 | 2.89 |
| 40 | 1.63 | 6.02 | 2.54 |
| 50 | 1.49 | 5.51 | 2.32 |
| 60 | 1.39 | 5.13 | 2.15 |
| 70 | 1.31 | 4.84 | 2.04 |
| 80 | 1.25 | 4.61 | 1.95 |
| 90 | 1.20 | 4.42 | 1.88 |
| 100 | 1.16 | 4.26 | 1.83 |
| 200 | 0.947 | 3.36 | 1.57 |
| 300 | 0.872 | 2.91 | 1.49 |
| 400 | 0.834 | 2.60 | 1.50 |
| 500 | 0.813 | 2.38 | 1.59 |
| 600 | 0.805 | 2.20 | 1.58 |
| 700 | 0.847 | 2.06 | 1.51 |
| 800 | 0.908 | 1.93 | 1.45 |
| 900 | 0.952 | 1.83 | 1.39 |
| 1000 | 0.925 | 1.73 | 1.34 |

FIG. 1 is a plot of the dynamic viscosity (ID) at 25° C. as a function of shear rate (1/s) for Example 1 (Sample No. WE1000972), Example 2 (Sample No. WE1000973) and Example 3 (Sample No. WE1000974).

TABLE 4

|  | Units | Eg. 1 | Eg. 2 | Eg. 3 |
|---|---|---|---|---|
| Penetration at −40° C. | 1/10 mm | 274 | 163 | 171 |

Discussion

The data shown in Table 3 above and in FIG. 1 demonstrates that the cable fill composition of Example 1 (according to the present invention, containing a Fischer-Tropsch derived base oil in combination with styrenic diblock polymer) exhibits almost the same dynamic viscosity when not sheared, but lower dynamic viscosity at high shear rates compared to the cable fill compositions of Comparative Examples 2 and 3 (comprising conventional Group II and Group III base oils, respectively, in combination with a styrenic diblock polymer). This means that the cable fill compositions of the present invention can be more easily and more quickly applied without any heating.

The data in Table 4 above demonstrates that Example 1 has a lower penetration value at −40° C. than that of the Comparative Examples. This means that the cable fill compositions of the present invention are softer at low temperatures and can be used in colder climates.

The data in Table 1 shows that the Fischer-Tropsch base oil used in Example 1 has a higher flashpoint than the base oils used in Comparative Examples 2 and 3. This demonstrates that the Fischer-Tropsch base oil used in the present invention is safer to use in cable fill compositions than the other more conventional base oils.

The data in Table 1 also shows that the Fischer-Tropsch base oil used in Example 1 has higher colour stability than the other two base oils used in Examples 2 and 3, respectively. This means that cable fill compositions according to the present invention require minimal or no antioxidants.

That which is claimed is:

1. A cable fill composition for an optical fiber cable, said cable fill composition comprising (i) a Fischer-Tropsch derived base oil; and (ii) a thickening system, wherein the thickening system comprises at least one block copolymer.

2. A cable fill composition according to claim 1 wherein the block copolymer is selected from a styrenic block copolymer.

3. A cable fill composition according to claim 1 wherein the block copolymer is selected from styrenic diblock copolymers, styrenic triblock copolymers and mixtures thereof.

4. A cable fill composition according to claim 1 wherein the block copolymer is selected from styrene-ethylene/butylene, styrene-ethylene/propylene, styrenebutadiene-styrene, styrene-isoprene-styrene, styrene-ethylene/butylene-styrene, styreneethylene/propylene-styrene, and mixtures thereof.

5. A cable fill composition according to claim 1 wherein the block copolymer is a styrene-ethylene/propylene block copolymer.

6. A cable fill composition according to claim 1 wherein the thickening system is present at a level of 15 wt % or less, based upon the weight of the cable fill composition.

7. A cable fill composition according to claim 1 wherein the Fischer-Tropsch derived base oil is present at a level of 80 wt % or greater, based upon the weight of the cable fill composition.

8. A cable fill composition according to claim 1 wherein the Fischer-Tropsch derived base oil has a kinematic viscosity at 100° C. in the range of 2 mm2/s to 35 mm2/s.

9. A cable fill composition according to claim 1 wherein the Fischer-Tropsch derived base oil has a kinematic viscosity at 100° C. in the range of from 2 mm2/s to 10 mm2/s.

10. A cable fill composition according to claim 1 wherein the cable fill composition comprises one or more additives.

11. An optical fiber cable, said optical fiber cable comprising a cable fill composition, said cable fill composition comprising (i) a Fischer-Tropsch derived base oil and (ii) a thickening system.

12. A cable fill composition according to claim 1 wherein the thickening system is present at a level in the range of 3 wt % to 10 wt %, based upon the weight of the cable fill composition.

13. An optical fiber cable according to claim 11 wherein the thickening system comprises at least one block copolymer.

14. An optical fiber cable according to claim 11 wherein the block copolymer is selected from a styrenic block copolymer.

15. An optical fiber cable according to claim 11 wherein the block copolymer is selected from styrene-ethylene/butylene, styrene-ethylene/propylene, styrenebutadiene-styrene, styrene-isoprene-styrene, styrene-ethylene/butylene-styrene, styreneethylene/propylene-styrene, and mixtures thereof.

16. An optical fiber cable according to claim 11 wherein the Fischer-Tropsch derived base oil has a kinematic viscosity at 100° C. in the range of 2 mm2/s to 35 mm2/s.

17. A method comprising: providing an optical fiber cable and a cable fill composition, said cable fill composition comprising (i) a Fischer-Tropsch derived base oil and (ii) a thickening system that comprises at least one block copolymer; and supplying the cable fill composition to an interior interstitial space of the optical fiber cable.

18. The method according to claim 17 wherein the block copolymer is selected from a styrenic block copolymer.

19. The method according to claim 17 wherein the block copolymer is selected from styrene-ethylene/butylene, styrene-ethylene/propylene, styrene-butadienestyrene, styrene-isoprene-styrene, styrene-ethylene/butylene-styrene, styrene-ethylene/propylenestyrene, and mixtures thereof.

* * * * *